May 7, 1935.  A. C. ACCETTA  2,000,734
FISH LURE
Filed Jan. 11, 1933
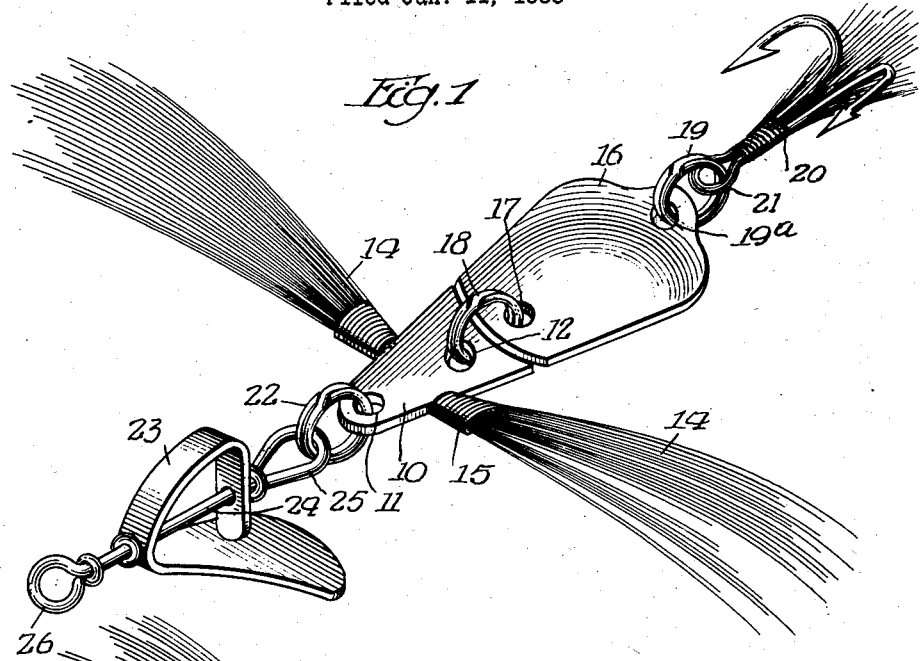
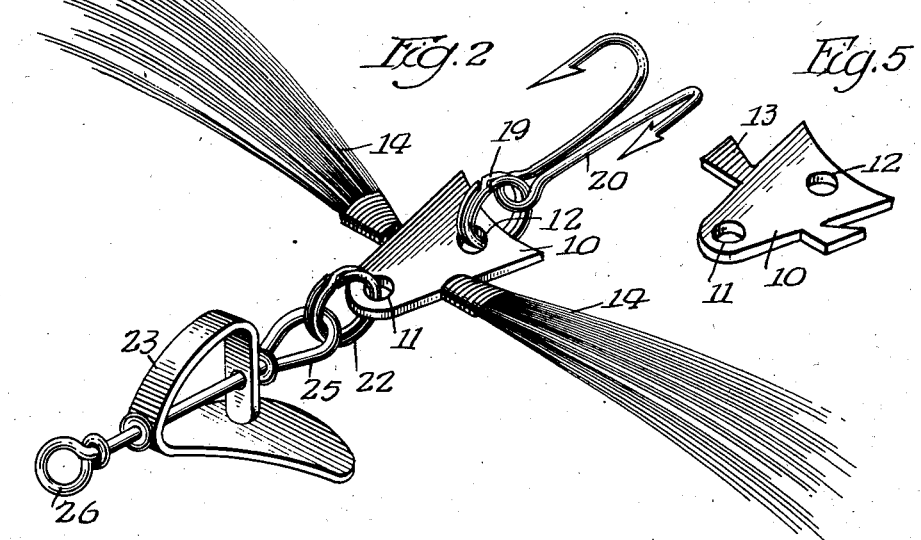
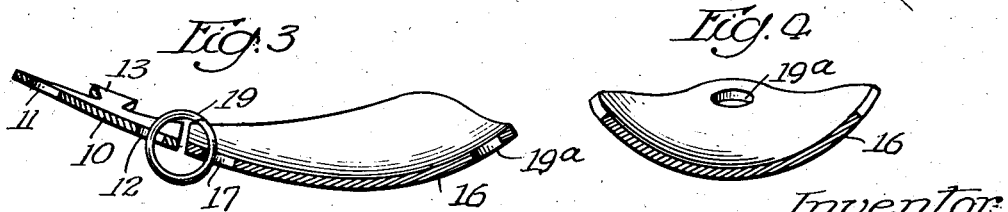
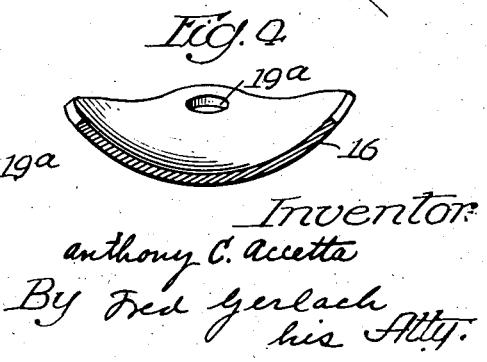
Inventor
Anthony C. Accetta
By Fred Gerlach
his Atty.

Patented May 7, 1935

2,000,734

UNITED STATES PATENT OFFICE 2,000,734

FISH LURE

Anthony C. Accetta, Cleveland, Ohio

Application January 11, 1933, Serial No. 651,172

8 Claims. (Cl. 43—42)

The invention relates to fish lures.

The objects of the invention are: to provide an improved lure which has wing-like members to cause it to glide or sail through the air when it is cast; to provide an improved artificial lure which will be life-like as it is being retrieved in the water or while trolling; to provide a spoon-like body with flexible members projecting from the sides thereof which will protect the hook or hooks from weeds; to provide an improved artificial lure which comprises a spoon-like body composed of units which are flexibly and detachably linked together for conjoint use and which can be separated for use in catching different species of fish; to provide an improved lure which can be reversed end to end to cause the bait to travel near the surface or in deep water; and other objects which will appear from the detailed descriptions.

The invention consists in the several novel features hereinafter set forth and more particularly defined by claims at the conclusion thereof.

In the drawing: Fig. 1 is a perspective of a lure embodying the invention with the head and body-sections connected for conjoint use. Fig. 2 is a perspective showing the lure with the rear or body-section removed. Fig. 3 is a longitudinal section of the head and body-sections of the spoon. Fig. 4 is a transverse section of the body-section of the spoon. Fig. 5 is a perspective of the head-section of the spoon before the flexible lure has been attached thereto.

The invention is exemplified in a lure with a spoon-like body comprising a head-section 10 formed of plate-metal and dished or concaved downwardly, flared rearwardly, and a rear or body-section 16 also formed of plate-metal. Section 10 is provided at its front with a hole or eye 11 for connection to the fishing-line and with a hole or eye 12 adjacent its rear margin. Flared tongues 13, integral with the plate forming head-section 10, project laterally from the sides of said plate to form supports for flexible wing-members 14. Each member 14 consists of a group of bucktail fibre or feathers secured to said tongues by suitable wrappings 15 so as to form a substantially flat laterally projecting flexible wing. These members project laterally and dihedrally from the head-section 10 similarly to the wings of an aeroplane, to cause the lure to glide or sail through the air when the lure is cast. These members 14 are flexed backwardly when the spoon is drawn through the water, so they will serve to deflect weeds from the hook behind the spoon.

The rear or body section 16 is dished or concaved downwardly and flared rearwardly with its sides in substantial continuation of the sides of the plate 10. The rear of section 16 is round. When the sections are connected together, they resemble a bug in appearance. Plate 16 is provided adjacent its front end with a hole 17. A split spring-ring 18 is adapted to be passed through the hole 12 in the head-section 10 and the hole 17 in the body-section 16 and forms a flexible or pivotal connection which permits free relative transverse and longitudinal movements of the sections. This freedom of relative movement causes the sections to move relatively to each other while the lure is being drawn through the water and gives it a life-like action. A hole 19a is formed adjacent the rear end of section 16. A double upstanding fish-hook 20 is removably and flexibly secured to the tail of the plate 16 by a split spring-ring 19 which is passed through the hole 19a and the connecting eye 21 of the hook 20.

A split spring-ring 22 is passed through the hole 11 at the front end of the head plate 10 for connection to a fishing line. If desired, a spinner 23 on a rod 24 with a rear loop 25 through which the split spring-ring 22 passes, may be used in advance of the head-section. The fishing line may be connected to an eye 26 at the front end of the rod 24 or may be connected directly to ring 22 if the spinner is dispensed with.

For light fly-rod fishing, it is desirable to dispense with the weight of body-section 16. The hook 20 is connected directly to the plate 10 by the split spring-ring 19 and the body-section 16 is eliminated as shown in Fig. 2. This produces a lure which is sufficiently light for light fly-rod fishing while possessing sufficient weight for casting. The spinner and rod 24 can be disconnected from the split spring-ring 22.

A characteristic of this lure is that when it is cast, the laterally and upwardly projecting tongues and flexible fibres 14 will act like wings of an aeroplane and cause the lure to glide or sail through the air without substantial rotation. During the cast, the ring 19 will permit the double hook 20 to fold forwardly and over the plate 10. When the lure strikes the water and sinks before retrieving, the hook is folded backward and during retrieving is automatically straightened out behind the plate. As the lure passes through the water, the flexible bucktail members will flex backwardly to deflect weeds from the hooks.

When the lure is used with the two flexibly connected sections 10, 16, as shown in Fig. 1, the wings 14 will act similarly in causing the lure to glide through the air during the cast. The sections and hook will straighten out as the lure is drawn through the water. The flexible members 14 will, as the lure is drawn through the water, flex backwardly and deflect weeds from the hooks. The lure with both sections connected, as it is drawn through the water, will resemble a complete live bug in appearance, the sections being free to swing transversely relatively to each other.

The plate forming the section 10, has a narrow and round front end and is approximately flat and its rear end is wide and downwardly convexed with its rear edge arcuate, so that when the lure is used, as illustrated in Figs. 1 and 2, the forward pull upon the plate 10 will have no substantial tendency to sink the lure in the water, thus causing it to travel on or near the surface of the water. The plate forming section 10 is provided with holes 11 and 12, and this permits its reversal from end to end so that the flared end will be forward or nearest the fishing line and so that the hook 20 can be connected by one of the split rings to the reduced end of the plate. This will bring the downwardly dished wide end of section 10 at the front or nearest the line, so that the arcuate front end will act as a scoop and cause the lure to be drawn downwardly in the water, for deep fishing.

The rear section 16 may also be directly connected to the line when a heavier section is preferred without the wings, and it may also be reversed by changing the hook from the wide end to the narrow end and attaching the line to the wide end.

The invention exemplifies a lure with a spoon-like body formed of plates flexibly and detachably connected together so that they may be used conjointly or singly; in which one of the plates is provided with flexible wings extending laterally and dihedrally to cause the lure to glide or sail through the air without substantial rotation which stabilizes the lure in traveling through the air and also causes it to land on the water right side up; in which either section is reversible end to end and has its respective ends shaped to cause it to travel toward or from the surface of the water; and which is readily adapted to be changed for different kinds of fishing.

The invention is not to be understood as restricted to the particular details set forth, since these may be modified within the scope of the appended claims, without departing from the spirit and scope of the invention.

Having thus described the invention, what I claim as new and desire to secure by Letters Patent, is:

1. In an artificial lure, the combination of a spoon-like body comprising front and rear sections, a flexible and detachable connection between the sections, means at the front end of the front section whereby it may be connected to a fishing line, and flexible wings projecting laterally from one of the sections.

2. In an artificial lure, the combination of a body formed of a plate having sides divergent substantially from end to end and its narrow end substantially flat and its wide end dished, the plate being reversible from end to end and provided at either end with means for connection to a line, the narrow end when foremost being adapted to direct the plate to the surface of the water and the wide end when foremost being adapted to direct the plate downwardly in the water, and a detachable hook adapted to be connected to either end of the plate.

3. In an artificial lure, the combination of a body formed of a plate having sides divergent substantially from end to end and its narrow end substantially flat and its wide end dished, the plate being reversible from end to end and provided at either end with means for connection to a line, the narrow end when foremost being adapted to direct the plate to the surface of the water and the wide end when foremost being adapted to direct the plate downwardly in the water, integral laterally projecting lugs on the plate, fibrous wings secured to said lugs and projecting laterally and upwardly, and a detachable hook adapted to be connected to either end of the plate.

4. In an artificial lure, the combination of a plate-like body comprising front and rear spoon-like sections having their sides divergent substantially continuously from the front to the rear ends thereof, both sections being downwardly concave substantially from the front to the rear ends, the contiguous rear edge of the front section and the front edge of the rear section being substantially aligned longitudinally, a detachable and flexible connection between the sections, means for connecting a line to either the front section or the rear section, and a hook adapted to be connected to either the front section or the rear section.

5. In an artificial lure, the combination of a plate-like body comprising front and rear spoon-like sections having their sides divergent substantially continuously from the front to the rear ends thereof, a detachable connection between the sections, means for connecting a line to either end of the front section or the front of the rear section, fibrous wings projecting laterally from the front section, and a hook adapted to be connected to either end of the front section or one end of the rear section.

6. In an artificial lure, the combination of a plate forming a body provided with means at one end for connection to a line, a hook connected to its other end, and a pair of lugs integrally formed with the plate projecting laterally and upwardly from its sides, and a pair of substantially flat flexible wings of fibre fixedly secured to the lugs and extending upwardly and laterally from the sides of the plate for causing the body to glide through the air.

7. In an artificial lure, the combination of a plate forming a body provided with means at one end for connection to a line, a hook connected to its other end, and a pair of lugs integrally formed with the plate projecting laterally and upwardly from its sides, a pair of substantially flat flexible wings of fibre for causing the body to glide through the air and wrappings securing the inner ends of the fibers to the lugs.

8. In an artificial lure, the combination of a plate-like body comprising front and rear downwardly concave sections, the contiguous rear edge of the front section and the front edge of the rear section being substantially aligned longitudinally, a flexible connection between the sections, means for connecting a line to the front end of the front section, laterally and upwardly projecting lugs on the front section, and a hook connected to the rear end of the rear section.

ANTHONY C. ACCETTA.